United States Patent [19]
Paris

[11] Patent Number: 6,104,787
[45] Date of Patent: Aug. 15, 2000

[54] METHOD AND APPARATUS FOR TRANSMITTING INFORMATION IN RESPONSE TO A VERBAL OR OTHERWISE AUDIBLE REQUEST THEREFORE

[76] Inventor: Harry G. Paris, 10300 Castlebridge Ct., Knoxville, Tenn. 37922

[21] Appl. No.: 09/061,749

[22] Filed: Apr. 16, 1998

[51] Int. Cl.[7] .................................................. H04M 11/00
[52] U.S. Cl. .................................... 379/93.01; 379/90.01; 379/93.12
[58] Field of Search .......................... 379/90.01, 93.01, 379/93.14, 93.15, 93.17, 93.23, 93.25, 93.26, 93.28, 93.31, 88.01, 88.04, 102.01, 102.02, 93.12, 93.02, 88.23, 88.24, 88.13

[56] References Cited

U.S. PATENT DOCUMENTS

| | | | |
|---|---|---|---|
| Re. 35,758 | 3/1998 | Winter et al. | 379/93.17 |
| 4,567,323 | 1/1986 | Lottes et al. | 179/18 |
| 4,918,722 | 4/1990 | Duehren | 379/100.11 |
| 4,920,558 | 4/1990 | Hird et al. | 379/67 |
| 4,941,123 | 7/1990 | Thompson | 364/200 |
| 4,991,199 | 2/1991 | Parekh et al. | 379/93.17 |
| 5,305,375 | 4/1994 | Sagara et al. | 379/89 |
| 5,345,501 | 9/1994 | Shelton | 379/88.24 |
| 5,418,845 | 5/1995 | Reeder | 379/213 |
| 5,444,767 | 8/1995 | Goetcheus et al. | 379/67 |
| 5,457,732 | 10/1995 | Goldberg | 379/57 |
| 5,592,538 | 1/1997 | Kosowsky et al. | 379/93.17 |
| 5,606,496 | 2/1997 | D'Agostino | 379/93.17 |

*Primary Examiner*—Curtis A. Kuntz
*Assistant Examiner*—Melur Ramakrishnaiah
*Attorney, Agent, or Firm*—Needle & Rosenberg, P.C.

[57] ABSTRACT

In an apparatus and method for transmitting a predefined set of information from a local station, operated by a user, to a remote station over a telephone connection, the set of information is stored and an audible request from the remote station for the set of information is presented to the user at the local station. A transfer signal, initiated by the user, that indicates that the user desires that the set of information be transferred to the remote station is generated. A circuit that is responsive to the transfer signal then transfers the set of information from the storing circuit to the remote station. A series of operational steps to be performed on a computer is used to effect the transfer of a predefined set of information from a local station to a remote station over a telephone line. An activation indicator, that indicates that a user desires the information to be transmitted, is generated in response to a user input at the local station. The computer takes control of the telephone line in response to the activation indicator. The computer transmits either a recorded analog signal containing the set of information or a digital data stream containing the set of information over the channel. The computer verifies that the set of information was properly received by the remote station. After verifying the accuracy of the transfer, the computer returns control of the telephone line to the telephone to either terminate or continue the call.

11 Claims, 4 Drawing Sheets

METHOD AND APPARATUS FOR TRANSMITTING INFORMATION IN RESPONSE TO A VERBAL OR OTHERWISE AUDIBLE REQUEST THEREFORE

BACKGROUND OF THE INVENTION

1. Field of the Invention

The present invention relates to information transfer systems and, particularly, to systems for transferring information in response to a verbal or otherwise audible request.

2. Description of the Prior Art

Success in direct telephone marketing depends on the speed with which the salesperson executes telephone calls. Generally, the more calls the salesperson is able to make in a given period, the more sales transactions are concluded. Also, the shorter the period of time spent in making the average sales call, the more calls the salesperson can make during the period. Thus, shortening the amount of time per sales call results in more sales being made per day.

Several devices have been developed to speed up sales calls. These include, for example, computerized speed dialers. Speed dialers automatically select and dial telephone numbers for the salesperson, thereby freeing the salesperson to devote time that would otherwise be spent dialing to actually making sales calls.

Individuals and businesses often must orally repeat basic information such as names, addresses, or phone and/or facsimile numbers every time they place telephone orders or otherwise conduct or transact certain types of business. For example, assume A calls B to place an order from a catalogue. B will usually request A's name, address, and possibly a credit card number and expiration date. In some instances, A's billing address may differ from the shipping address thereby requiring double the time and effort to execute the transaction. Later, when A calls B or C to place a different order, the same information must be given to complete the transaction.

Additionally, if B is an agent or distributor, another call must be placed from B to C to place the same order that caller A already entered to B. Hence the possibility of error is increased and additional time is lost due to the information transfers for both B and C.

There are several systems that transmit identification (hereinafter "I.D.") information about the user of a telephone to the other party to a conversation. For example, "Caller I.D." performs the function of identifying who is calling before answering the phone. Initially, Caller I.D. technology only transmitted the number of the caller, perhaps for security purposes, to recognize prank callers or to avoid answering calls from unwanted solicitors. Today, however, Caller I.D. Deluxe is available which indicates the caller's name and number before the phone is answered and multiple callers I.D. information (name and number) can be stored for later retrieval. Additionally, Caller I.D. service— by comparing to a table of stored numbers—can block calls from specified numbers and can play a recording for certain callers such as "This number is not accepting calls from your number." Caller I.D. requires the purchase or lease of an external device and a subscription from the local phone service provider, although some telephones now incorporate Caller I.D. display and storage capabilities, thus eliminating the need for an additional device. Caller I.D. information is programmed by the phone company on their own equipment. Caller A may precede a phone number with a sequence to display "private" or "unknown" on B's Caller I.D. display.

Another technology that relays caller information to the number called is facsimile transmission. The Federal Communications Commission (FCC) requires all transmittals of facsimile information to include within the header of the page the caller's I.D.—name and/or number—in order to leave no question as to where the fax originated. In other words, as part of the facsimile protocol, and after electronically establishing the link between both facsimile machines, the sender's fax transmits the "user I.D." to the receiver where the receiving facsimile machine displays and prints in the header of each page the sender's I.D., including name, company and/or phone number. Although the sender's I.D. must be entered by the user initially, it is technologically possible to connect and transmit a fax without this information.

Similarly, many personal computers and electronic information devices, such as personal organizers and personal digital assistants, or palmtop PC's and Network Computers, include telecommunications capabilities such as a modem, or fax and voice phone capabilities. Similar to the discussion relating to fax machines above, the connection must be made and FCC regulations apply to any device utilizing telephone system lines or cellular phone towers. In all cases, modems, facsimile machines and most electronic devices that communicate must initiate communications across the phone lines such that they are communicating at the same speed with the same language or protocol. Once sending and receiving devices are "communicating," data transfer and verification can proceed until completed. Once data transfer is completed, the connection is terminated systematically and the event is logged at both ends for later verification by either or both parties if desired. If the event is incomplete or "unsuccessful," it is so logged. In most cases, the electronic devices will automatically call and attempt the connection again with no or minimal interaction by one or both parties.

In all the above referenced technologies, the caller's I.D. information is involuntarily transmitted unless special or illegal steps are taken to prevent such transfer. Furthermore, Caller I.D. information is programmed at the telephone company's "switch" and the caller cannot customize or utilize the information any further to his or her benefit.

Electronic or digital transfer of information via facsimile, personal computer, etc. is a proven reliable method of information and data transfer. However, verbal telephone communication is far from perfect. Thus, verbal information transfer over the telephone has the disadvantages of being inefficient and being prone to error.

No device exists that electronically transmits personal information in response to a automatic or verbal query. Furthermore, no device exists that allows accurate and fast transmission of personal information upon a command from a user.

SUMMARY OF THE INVENTION

The disadvantages of the prior art are overcome by the present invention which is an apparatus for electronically transmitting personal, and other, information in response to a verbal query. The method of the invention includes a process for transferring "Bill To," "Ship To," or other pre-programed personal or business information accurately and quickly for the benefit of a sending and/or receiving party over a telephone line. The method greatly improves the process of acquiring necessary basic information while significantly reducing the possibility of errors in communication which may result from misunderstood words, foreign accents, misspelled names and addresses, poor phone connections and other factors affecting audible comprehension and transcription during a routine telephone call. This technology is especially beneficial to expedite, among other things, order taking. Furthermore, productivity and profitability is increased since much time is lost and long distance phone charges are often incurred while acquiring such information.

The information may be reported through several processes, including: 1) pre-recorded audio, 2) displayed alphanumerics, 3) printed alphanumerics, or 4) direct transfer into a software program, such as contact management software, purchasing/sales software, databases or other programs where such information may be displayed instantly, logged, saved, recalled and even transferred from a company operator to an employee's extension or from an automated answering system to the target person once he or she answers.

The transfer of personal information by this method is an intentional function that can be activated on a per call basis (i.e., on demand), in response to a tone sequence or during a conversation. The transfer may be achieved when an individual or computer answers a telephone, upon command by either party during a telephone conversation or connection, or at the end of the conversation after both parties hang up. The telephone connection is not terminated until the transmission of information has been competed. If one party has an afterthought after hanging up and before the information has completed transfer, either caller may pick up the telephone and the other party will get an audible or visual alert that indicates that he or she is needed again. Hence, the alerted party may pick up the telephone and continue the conversation.

One aspect of the invention is an apparatus for transmitting a predefined set of information from a local station, operated by a user, to a remote station over a telephone connection. The apparatus includes a circuit for storing the set of information and a circuit for presenting to the user at the local station an audible request from the remote station for the set of information. A circuit generates a transfer signal, initiated by the user, or the user's equipment, that indicates that the user desires that the set of information be transferred to the remote station. A circuit that is responsive to the transfer signal then transfers the set of information from the storing circuit to the remote station. It is understood that the elements of this aspect may be implemented using a combination of hardware and software. The transfer may be initiated by either or both parties, depending on the respective party's requirement for the personal information.

Another aspect of the invention is a series of operational steps to be performed on a computer used to effect the transfer of a predefined set of information from a local station to a remote station over a telephone line. An activation indicator is generated in response to a user input at the local station. The activation indicator indicates that a user desires the information to be transmitted over the telephone line. The computer takes control of at least one channel on the telephone line in response to the activation indicator. The computer detects a protocol type indicator from the remote station and then transmits a recorded analog signal containing the set of information over the channel when the protocol type indicator indicates that the remote station is capable of receiving analog information. The computer also transmits a digital data stream containing the set of information over the channel when the protocol type indicator indicates that the remote station is capable of receiving digital information and then verifies that the set of information was properly received by the remote station. Then the computer disconnects the telephone line after the verifying step if the callers have finished their call.

Yet another aspect of the invention is an apparatus for transmitting a predefined set of information from a local station to a remote station over a telephone line. A circuit stores the set of information at the local station. A verbal request for the set of information is received via a telephone line from a remote station. A switch, or other indicating device, activates the storing circuit in response to the verbal request. A circuit then transmits the set of information from the storing circuit to the remote station in response to activation of the storage circuit.

Yet another aspect of the invention is a method of transmitting a predefined set of information from a local station to a remote station over a telephone line. The set of information is stored in an electronic device. An audible request for the set of information is received from the remote station over the telephone line. The electronic device is activated in response to the verbal request. The set of information is transmitted from the electronic device to the remote station over the telephone line in response to the activating step.

These and other aspects of the invention will become apparent from the following description of the preferred embodiment taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
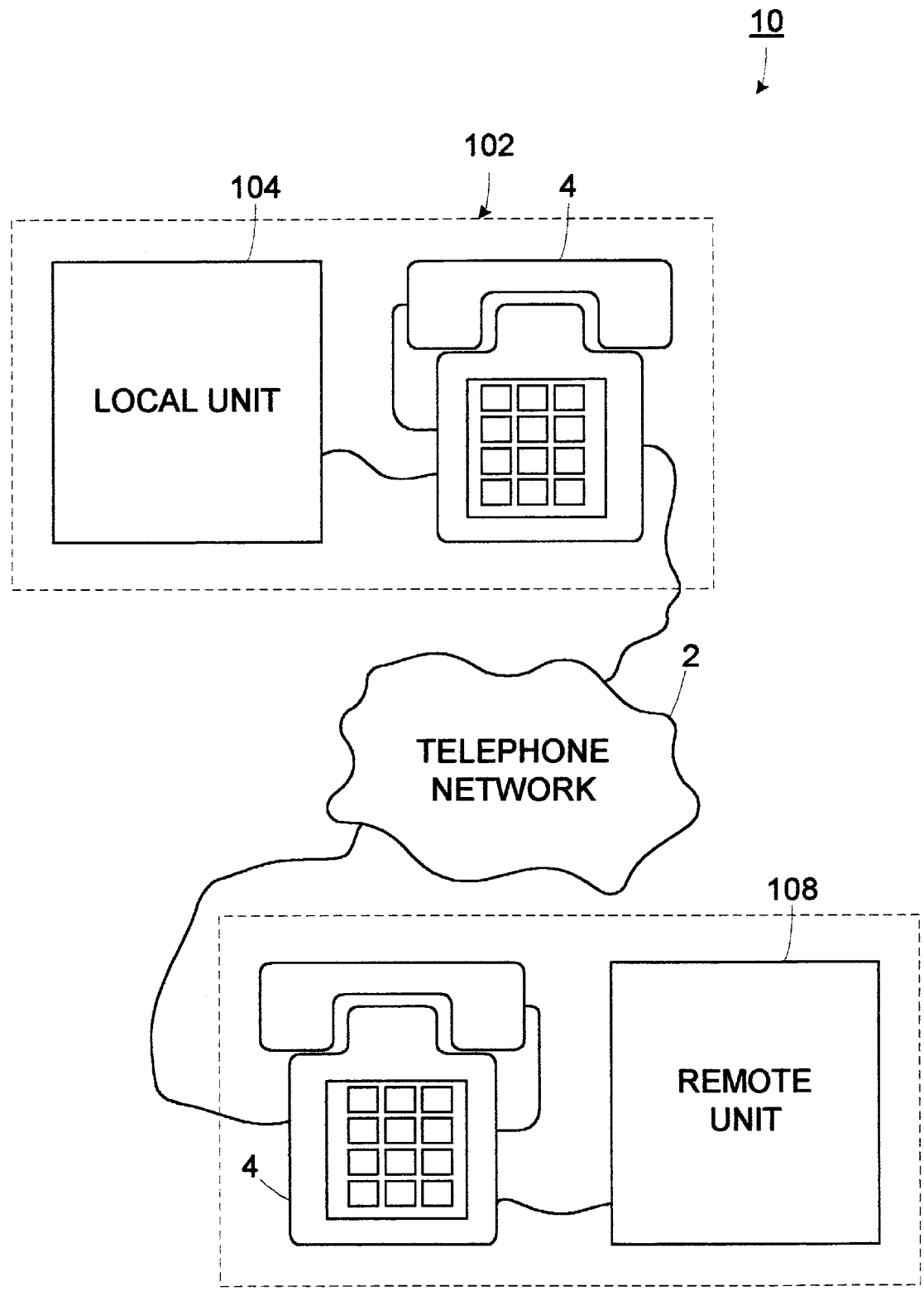
FIG. 1 is a schematic diagram of two information transfer units interacting with an existing telephone network.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: "a," "an," and "the" includes plural reference, "in" includes "in" and "on." It is understood that use of the terms "local" and "remote" may be interchangeable, depending upon the specific application. It is also understood that "verbal" and "audible" may be interchangeable.

As shown in FIG. 1, the present invention 10 allows a user at a local station 102 to transmit automatically a predefined set of information to a user at a remote station 106 through an existing telephone network 2. The local station 102 comprises a telephone 4, or equivalent device, and a local unit 104 that stores and transmits the information to the remote station 106 upon demand. Similarly, the remote station 106 includes a telephone 6, or equivalent device, and a remote unit 108 for receiving and managing the received information. Telephone handset 6 is connected to the telephone network 2 over which the remote station 106 is capable of audibly communicating with the user at the local station 102. The user at the remote station 106 transmits a verbal or audible request for the set of information to the user at the local station 102 and the user at the local station 102 then activates the local unit 104, which effects the transfer of the information to and from the local unit 104 to the remote unit 108. An audible request could comprise a series of tones.

Figure 2:
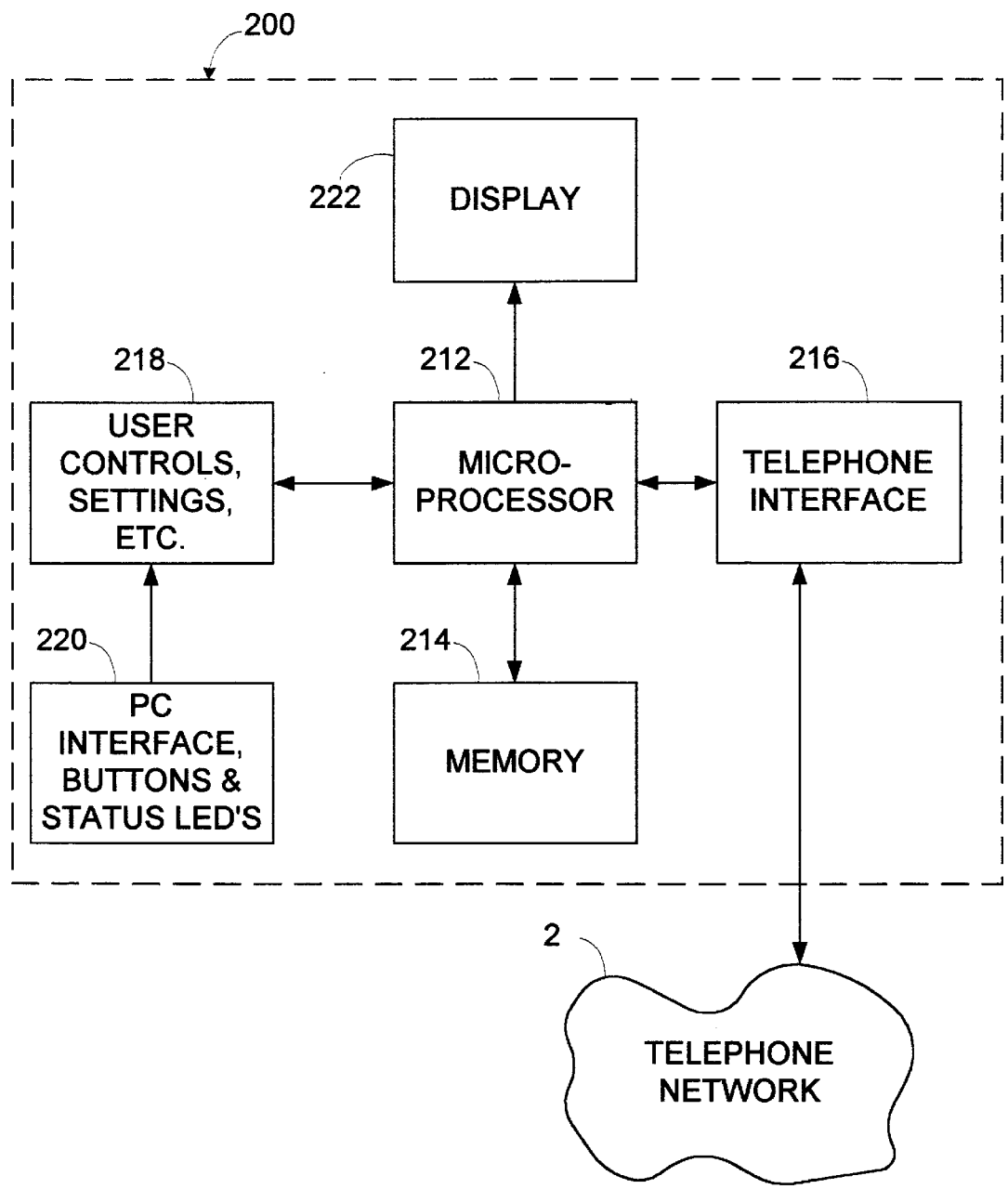
FIG. 2 is a block diagram of a general information transfer unit in accordance with the invention.

As shown in FIG. 2, a general information transfer unit 200 (which could serve as either a local unit 104 or a remote unit 108, depending on configuration) includes a microprocessor 212 that controls information transfer. Local unit 104 and/or remote unit 108 may be built-in to the telephone company equipment. A memory 214 stores the information as digital data that is either transferred (in the case of the local station), or received (in the case of the remote station). A telephone interface 216 interconnects the microprocessor 212 to the telephone network 2. A control unit 218 allows the users to initiate their respective functions of the information transfer. Although both the local unit 104 and the remote unit 108 could be provided with an interface to a personal computer 220 and a display 222, these devices would more likely be included in the remote unit 108.

The microprocessor 212 is programmed to perform the following steps: read the set of information as a set of digital data from the memory 214, convert the set of digital data to a signal in a format readable by the remote station, and transmit the signal to the remote station 106. The microprocessor 212 in the local unit 104 is responsive to an activation signal that is initiated by a switch, which could be either an actual switch or a virtual switch (such as a button on a computer display). The microprocessor 212 could also be programmed to sense when the local user has hung up its telephone 4 and then begin the transmission of the set of information and upon completion would automatically disconnect the telephone connection.

The local unit 104 of the local station 102 may be embedded in the local telephone 4. However, in alternate embodiments, the local unit 104 could be a portable unit (such as one embedded in a personal organizer) for use with pay telephones, a stand alone unit or embedded in the local user's computer system.

The remote unit 108 could be embodied in a device that includes any one of the following: a computer that stores digital data; an analog recorder; a fax machine; a label printer; a video screen; or combination of these devices. Although in the embodiment disclosed herein, the information is transmitted as digital data, the information could also be transmitted as an analog sound recording. The information could also be transmitted through an inaudible channel simultaneously with a telephone conversation. Once the information is received, it may be printed, displayed, recorded, stored or otherwise saved, presented and/or played back.

Not only may basic information be transmitted using this system, but other types of information may be transmitted as well. For example, individuals may program directions or delivery information into the system. Businesses from pizza delivery restaurants to trucking companies could thereby receive accurate directions to a customer's physical location rather than relying on maps or memory.

Figure 3:
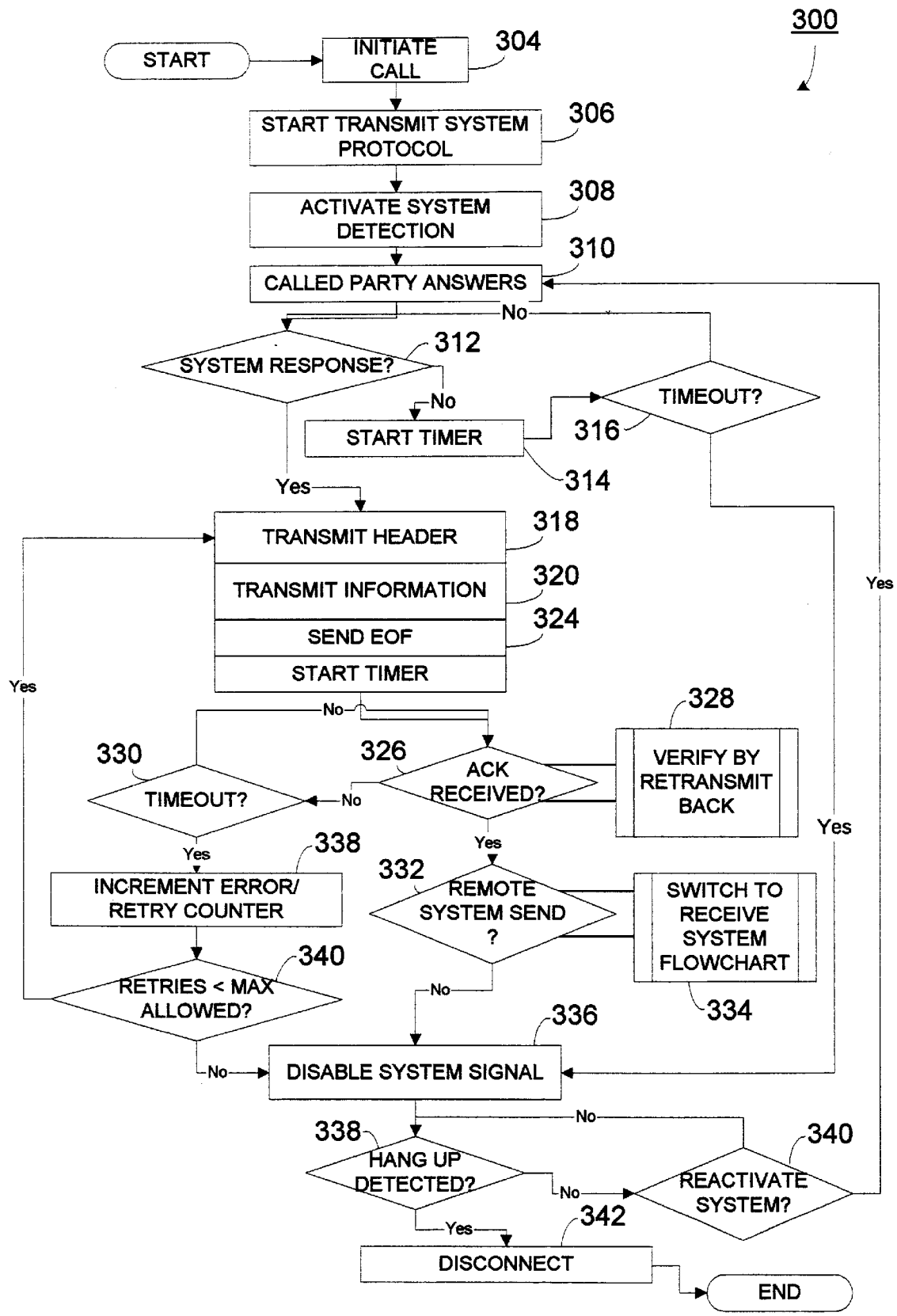
FIG. 3 is a flow chart showing the steps employed in a transmit sequence.

As shown in FIG. 3, a program used to drive the TRANSMIT protocol in one embodiment starts with the call being initiated 304, the TRANSMIT protocol being started 306 and the system detection being activated 308. The called party answers 310 and a test 312 is performed to determine if the system is responding. If no system response is detected then a timer is started 314 and a test 316 is performed to determined if a timeout condition has occurred. If a timeout has occurred, then the system will be disabled 336.

Once a system response is detected 312, then the system transmits a header 318, sends the information 320 and then sends an end of file marker 322. A timer is started 324 and a test 326 is performed to determine if an acknowledgment has been received. Concurrently, a verification routine 328 is executed by retransmitting the data back to the sender. While no acknowledgment has been received, a test 330 for a timeout occurs. If a timeout occurs, a counter is incremented 338 and a test 340 is performed to determine if a maximum number of retries has been exceeded. If not, the information is retransmitted, starting with the header 318. If so, the system is disabled 336.

Once the acknowledgment has been received 326, a test is performed to determine if the receiving system intends to send data. If it does, the thread of execution switches to the RECEIVE protocol 334 (discussed below). If no further data transmission occurs, then the system is disabled 336 and a test 338 is performed to detect a hang up condition. If the no hang up is detected, then a test 340 is performed to determine if the system is to be reactivated (e.g., the users want to reattempt an information transfer). If the system is to be reactivated, then the thread of execution returns to the "party answers" block 310. If a transfer occurs and a hang up condition is detected 338, then the call is disconnected 342.

Figure 4:
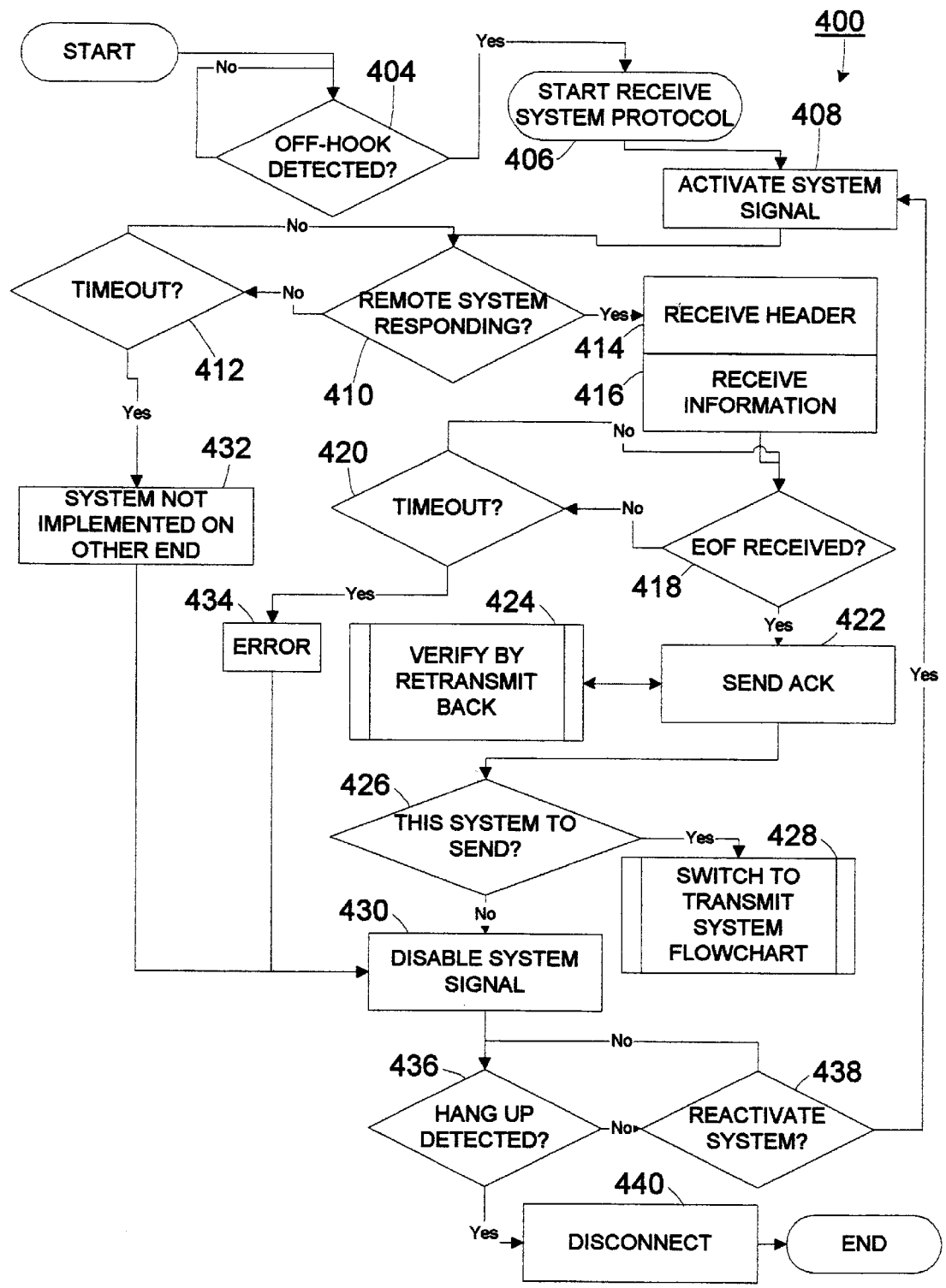
FIG. 4 is a flow chart showing the steps employed in a receive sequence.

As shown in FIG. 4., a program used to drive the RECEIVE protocol in one embodiment first detects an off-hook condition 404 in the telephone line. The RECEIVE system protocol is started 406 and an activate system signal is generated 408. A test 410 is performed to determine if the remote system is responding. If it is not, then a test 412 is performed to determine if a timeout has occurred. If a timeout occurs, then a "System not Implemented" signal is generated 432 indicating that the system is not implemented at the other end, and then the system is disabled 430. If the remote system is responding 410, then a receive header is generated 414 and the information is received 416.

A test 418 is performed to determine if an end-of-file marker has been received. If not, a test 420 is performed is performed to determine if a timeout has occurred. If a timeout has occurred, then an "Error" signal is generated 434 and the system is disabled 430. If the end-of-file marker is received 418 then and acknowledgment is sent 422 and the data is verified 424 by a retransmission routine.

A test 426 is performed to determine if the receiving station desires to transmit data. If so, the thread of execution is transferred to the TRANSMIT protocol discussed above. Otherwise, the system is disabled 430 and a test 436 is performed to determine if a hang up has been detected (indicating that at least one of the parties has hung up its telephone). If no hang up is detected then a test 438 is performed to determine if the system is to be reactivated and, if so, the thread of execution is returned to the generation of the activate system signal generation 408. Once a hang up is detected 436, then the system is disconnected 440.

In one embodiment, one, or both, of the parties would be provided with a visual or audible signal indicating successful transfer of the requested information. Upon receiving a new call, the signal is reset for the next call.

In an alternate embodiment, the information is recorded at a telephone company exchange, with the information being indexed by the user's telephone number. The user activates the system by entering "*" followed by a number. The telephone exchange then transmits the information to the receiving party. Further embodiments include having multiple sets of information indexed to a single number, with each set being identified by a unique code (e.g., "*61" would index a first resident's personal information and "*62" would index a second resident's personal information. This could be especially useful where a single line services a family or several departments of a single business.

Should an error in the transmission process occur or an immediate need arise to converse again, either party may pick up the handset and, if the connection has not been disconnected, cause the other party's phone to ring once. The other party may then answer the phone and begin conversing. A visual and/or audible indicator may be used to indicate a connection is present or data is being transferred.

Routine business telephone transactions employing the present invention may occur in one of several ways: (1) at initial connection—the invention may be set to immediately transmit and receive data automatically before a conversation begins; (2) on demand by one or both parties—information may be transmitted during a phone call (in the background) if one or both of the conversing parties presses a button; or (3) when concluding the call—the system may be activated when a conversation ends and one or both parties hang up the phone. Upon the completion of the transmission, the local unit 104 may terminate the connection or it may allow one or both parties to pick up the handset and continue a conversation.

Uses of the invention described herein include transmission of "Bill To" and/or "Ship To" information—transfer of basic billing and shipping information during business transactions. Typical transactions include placing an order directly to a manufacturer, placing an order through an agent to a manufacturer, placing an order to a "catalogue" company or "phone bank" such as shop at home services on television, Internet or any other 2-way transactions. The information should be structured in a consistent, pre-defined format or protocol so all devices embodying the invention will be compatible. Absent a telephone system failure of carrier disconnection, the information should be transmitted quickly and accurately.

Transfers may be automatically tagged with time (plus CST, EST, etc.), date, phone of senders and fax information as a small header (or footer) similar to the header on a fax. The billing and shipping information may be printed directly onto a label, a purchasing order, an invoice or stored in a computer. Labels may be printed directly for use on packages or mail with small headers or footers indicating telephone number, fax number, date, time and/or e-mail address.

In one embodiment, the billing information may be formatted as follows:

smaller font (right justified):

Header 1                                   <Phone / Fax>
Header 2                                   <Time (Zone) & Date>
normal font (left justified):

Line 1 Accounts Payable
Line 2 Company A or Name
Line 3 Suite Number
Line 4 Street Address or Post Office Box
Line 5 City, State ZIP -continued Line 6 (available - Country?)
Line 7 (available - RE: P.O. #, credit card #, time to bill, etc)

Note: Multiple Bill To:'s may be selected by a sender depending on the memory and features available on specific models.

Similarly, shipping information may be formatted as follows:

smaller font (right justified):

Header 1                                 <Phone / Fax>
Header 2                                 <Time (Zone) & Date>
normal font (left justified):

Line 1 (available - RE: P.O. #, etc.)
Line 2 (available - Name / Department)
Line 3 Company A, B or Name
Line 4 123 Main Street
Line 5 Suite, Warehouse, etc.
Line 6 City, State ZIP
Line 7 (available - Country)

Note: Multiple Ship To:'s may be selected by a sender depending on the memory and features available on specific models.

A "Directions" file could he included in the set of information that describes directions from a major area landmark that most delivery service providers will be familiar with. The sender or receiver of the directions may trigger the transfer. The Directions file may include multiple choices of files in metropolitan areas: (i.e., directions from an airport or from a north, south, east or west approach into a city). A general or primary Directions file may then be linked from a common landmark (i.e., directions from the north, south, east or west) direct to. A software link between secondary and primary directions may thereby create the single Direction file to be transferred.

A "Leave Word" mode may be included that transmits a minimal amount of I.D. data to provide a receiver evidence that a sender has called. For example, a telephone equipped with this embodiment may be set to answer after a preselected number of rings (set by the receiver). When the telephone is answered, the sender's name and phone number as well as time and date information may be sent to the receiver's unit 108 upon the sender's command. If the receiver has an answering machine, the sender may transmit his or her I.D. information directly into an answering machine that is so equipped, or an audible "leave word" sequence may be initiated letting the caller hang up immediately. The system could assign a speed dial number or directly record what was previously received to facilitate the returning of a call. Similarly, an auto dial button could be provided to allow for quick response. A receiver may turn the Leave Word mode "on" or "off" when he or she leaves his or her office. A switch for turning the unit off is provided, as is generally known to those of skill in the art.

A function that terminates unwanted calls with an announcement may be provided. The format of the announcement will be an audible playback of the receiver's preprogrammed message indicating nonacceptance of the call followed by disconnection.

The sender's information may be provided for attachment to a receiver's communications log, order form, phone notes, etc. and vice versa. The information is provided for use in any form practical to the user(s), including: serial data, parallel data, printed labels, screen dump, or any imaginable form serving a similar purpose.

Other embodiments for storing an individual's I.D. information could include a wristwatch which uses infrared (or other means) to transfer and/or receive information from a similarly equipped telephone and a "smart card" employing the electronics described above.

All received information may be stored for later transfer to another location. Such a case includes a sales agent receiving an order who must pass the order to the manufacturer or another location and telephone. An alternate method of transferring a customer's I.D. is to transfer directly "through" the agent(s) to the final destination without any changes to, or recreating of, the customer's billing, shipping and other information. Likewise, if a call must be transferred to another extension by a secretary or receptionist, the sender's information may be transferred to the extension as well without inconveniencing or burdening the secretary or receptionist.

Currently, emergency 911 service is provided to speed up response to emergency calls. The invention can enhance the accuracy of the E-911 service by transmitting name, address and/or directions to the E-911 service at the push of a button, thereby effectuating an efficient response to an E-911 call. As discussed above, the "directions" may be forwarded directly to the responding emergency response vehicle(s).

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. An apparatus for transmitting a predefined set of information from a local station to a remote station over a telephone line, comprising:
    a. means for storing a set of information necessary for ordering a product from a vendor at the local station;
    b. means for receiving a verbal request for the set of information from a remote station;
    c. means for activating the storing means in response to the verbal request, the activating means comprising a digital computer and a switch that generates an activation signal, wherein the digital computer is responsive to the activation signal and wherein the computer and the switch are embedded in a telephone; and
    d. means for transmitting the set of information from the storing means to the remote station in response to the activating step.

2. An apparatus for transmitting a predefined set of information from a local station to a remote station over a telephone line, comprising:
    a. means for storing a set of information necessary for ordering a product from a vendor;
    b. means for receiving a verbal request for the set of information from a remote station;
    c. means for activating the storing means in response to the verbal request; and
    d. means for transmitting the set of information from the storing means to the remote station in response to the activating step, wherein the storing means is located at a telephone exchange and wherein the activating means comprises a circuit for generating a plurality of DTMF tones that causes the telephone exchange to transmit the set of information.

3. The apparatus of claim 2 wherein the receiving means comprises a telephone handset connected to the telephone line over which the remote station is capable of audibly communicating with a user at the local station.

4. The apparatus of claim 3 wherein the receiving means comprises a telephone handset and wherein the transmitting means comprises means for transmitting the set of information after the user hangs up the telephone handset.

5. The apparatus of claim 2 wherein activating means comprises a digital computer.

6. The apparatus of claim 5 wherein the activating means comprises a computer program, stored in computer-readable memory, that causes the digital computer to perform the following steps:
    a. read the set of information as a set of digital data from the storing means;
    b. convert the set of digital data to a signal in a format readable by the remote station; and
    c. transmit the signal to the remote station.

7. The apparatus of claim 5 wherein the activating means comprises a switch that generates an activation signal and wherein the digital computer is responsive to the activation signal.

8. A method of transmitting a predefined set of information from a local station to a remote station over a telephone line, comprising the steps of:
    a. storing a set of information necessary for ordering a product from a vendor;
    b. receiving from the remote station an audible request for the set of information over the telephone line;
    c. activating the electronic device in response to the verbal request, thereby indicating that the set of information is to be transferred to the remote station in a format that is readable by the remote station; and
    d. automatically transmitting the set of information from the electronic device to the remote station over the telephone line in response to the activating step,
wherein the set of information is stored at a telephone exchange and wherein the activating step comprises the step of playing a series of DTMF tones over the telephone line thereby causing the telephone exchange to transmit the set of information to the remote station.

9. The method of claim 8, further comprising the step of displaying the set of information on a video screen at the remote station.

10. The method of claim 8, further comprising the step of printing the set of information at the remote station.

11. The method of claim 8 wherein the activating step comprises the step of commanding a computer to transmit the set of information over the telephone line.

* * * * *